C. H. TUMEY, Sr.
ADJUSTABLE LIGHT VISOR.
APPLICATION FILED APR. 13, 1920.

1,416,245.

Patented May 16, 1922.

C. H. Tumey, Sr. INVENTOR.

BY

ATTORNEY.

UNITED STATES PATENT OFFICE.

CHARLES H. TUMEY, SR., OF SAN ANTONIO, TEXAS.

ADJUSTABLE LIGHT VISOR.

1,416,245. Specification of Letters Patent. Patented May 16, 1922.

Application filed April 13, 1920. Serial No. 373,514.

*To all whom it may concern:*

Be it known that I, CHARLES H. TUMEY, Sr., a citizen of the United States, residing at San Antonio, in the county of Bexar and State of Texas, have invented certain new and useful Improvements in Adjustable Light Visors; and I do hereby declare the following to be a full, clear, and exact description of the invention, such as will enable others skilled in the art to which it appertains to make and use the same.

This invention relates to new and useful improvements in adjustable visors for headlights of motor vehicles and has for its primary object the provision of a sector which may be moved in relation to the headlight for the purpose of controlling the light rays therefrom and which is advantageous as the blinding of approaching traffic can be prevented and a strong bright light may be had whenever desired, by the adjusting of the visor in relation to the headlight.

A further object of this invention is the provision of a visor of the character stated, that may be constructed from a plurality of sectors, telescopic in relation to each other so that the control of the light rays may be varied.

A still further object of this invention is the provision of an adjustable visor of the above stated character, which shall be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1:
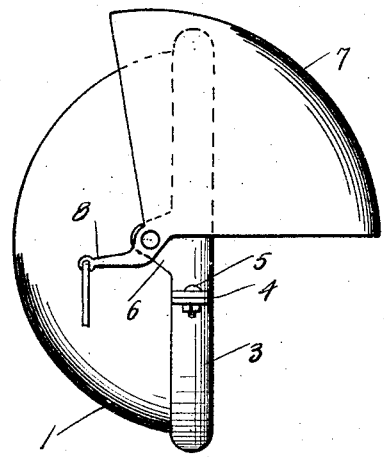
Figure 1 is a side elevation illustrating an adjustable visor constructed in accordance with my invention and applied to a headlight.
Figure 2:
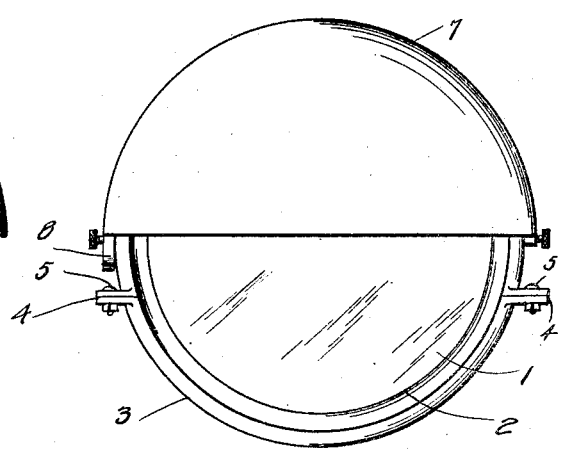
Figure 2 is a front elevation illustrating the same.
Figure 3:
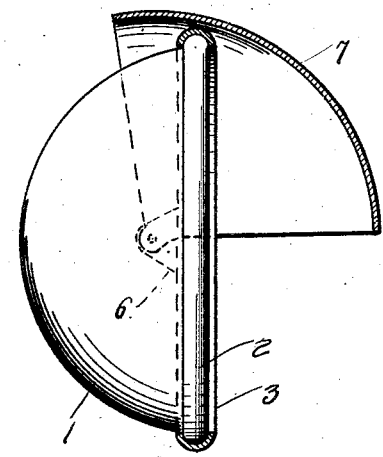
Figure 3 is a sectional view illustrating the attaching band.
Figure 4:
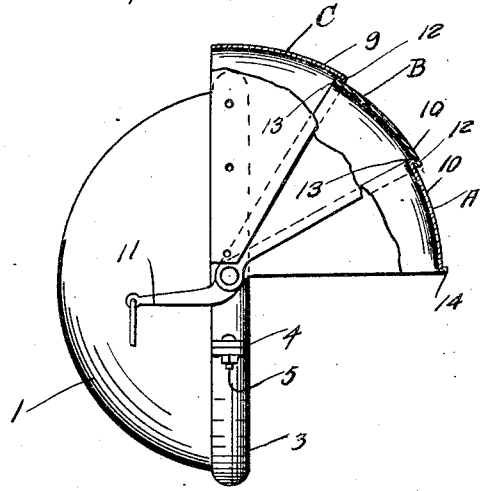
Figure 4 is a sectional view illustrating a modified form of my invention.

Referring in detail to the drawing, the numeral 1 indicates as an entirety a headlight of an ordinary construction, having the usual lens supporting rim 2 on which my invention is mounted.

An adjustable or split band 3 is curved to conform to the contour of the lens supporting band 2 and at its ends is provided with ears 4 through which a fastening elements 5 extends for the purpose of detachably securing the band about the lens supporting rim 2 of the headlight. Rearwardly extending ears 6 are formed integrally with the band 3 and disposed on opposite sides of the headlight 1 and have pivoted thereto a visor 7 which is disposed over the upper portion of the headlight and is of substantially sector shape and is adapted to be moved in relation to the headlight 1 on its pivot for the purpose of overlying a portion of the lens of the headlight to direct the rays of light from the headlight downwardly therefrom and prevent glares in the eyes of approaching traffic. The visor 7 may be swung rearwardly so as to uncover the front of the headlight when desiring to obtain a strong and brilliant light. An arm 8 is formed on one of the pivoted ends of the visor 7 and may be connected to a suitable controlling means (not shown) and located adjacent the operator of the automobile whereby the visor 7 can be adjusted in relation to the headlight.

However, the pivotal connection between the visor and the rearwardly extending ears 6 may be of the frictional or tension type so that the visor may be adjusted to a desired point in respect to the headlight and will remain in this position until again manually adjusted.

The visor has its inner surface highly polished so that the rays of light striking against the same will be deflected onto the roadway.

Referring to my modified form of invention, the visor 9 consists of a plurality of telescopic sectors 10 that are pivotally connected to the rearwardly extending ears 6 of the band 3 and the outermost sector A has formed integrally with one of its pivoted ends an acuating arm 11 so that upon movement of said arms, the sectors 10 can be moved to telescope one within the other, or can be extended to overlie the front of the headlight. The inner sector B is secured to the band 3 so that the same will have non-movement in relation thereto during the movement of the other sectors in relation to the headlight. Inwardly extending flanges 12 are formed on the sectors B and C and are engaged by outwardly extending flanges 13 on the sectors A and B to prevent separation of the sectors when in shielding position. The sector A is provided with an outwardly extending flange 14 to cause the sector B to move into the sector C on movement of the sector A into said sector C.

From the foregoing description taken in connection with the accompanying drawing, it will be noted that a device has been provided which can be easily and conveniently applied and removed from a headlight and which will obviate glaring headlights on the approach of traffic and when the roadway is unobstructed or used by traffic a strong and brilliant light may be obtained by adjusting the visor in relation to the headlight.

While I have shown and described the preferred embodiment of my invention, it will be understood that minor changes in construction, combination, and arrangement of parts may be made without departing from the spirit and scope of the invention, as claimed.

What is claimed is:—

A headlight visor comprising a flexible annular attaching band transversely curved to receive the convex outer face of a lens supporting ring of a headlight and including a pair of detachably connected sections, one of said sections being of a greater length than the other sections and having its ends extending below the horizontal axis of the headlight, rearwardly extending ears formed on the longest section and arranged in alinement with said axis of the headlight, and a visor pivoted to said ears rearwardly of the band to permit said visor to cover the upper portion of the head light when in a full light deflecting position and thereby prevent the escape of light rays over the top of the visor.

In testimony whereof I affix my signature in presence of witnesses.

CHARLES H. TUMEY, Sr.

Witnesses:
    NED. McILHENNY,
    GEO. J. PANCOAST,
    D. ENRIGHT.